United States Patent
Nielsen et al.

(10) Patent No.: US 11,531,357 B1
(45) Date of Patent: Dec. 20, 2022

(54) SPATIAL VECTOR-BASED DRONE CONTROL

(71) Applicant: Snap Inc., Santa Monica, CA (US)

(72) Inventors: Simon Saito Haagen Nielsen, Beverly Hills, CA (US); David Meisenholder, Manhattan Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/146,569

(22) Filed: Sep. 28, 2018

Related U.S. Application Data

(60) Provisional application No. 62/568,656, filed on Oct. 5, 2017.

(51) Int. Cl.
| | | |
|---|---|---|
| *G05D 1/10* | (2006.01) | |
| *G01C 21/00* | (2006.01) | |
| *B64C 39/02* | (2006.01) | |

(52) U.S. Cl.
CPC ........... *G05D 1/101* (2013.01); *B64C 39/024* (2013.01); *G01C 21/00* (2013.01); *B64C 2201/027* (2013.01); *B64C 2201/108* (2013.01); *B64C 2201/141* (2013.01)

(58) Field of Classification Search
CPC ....... G05D 1/101; B64C 39/024; G01C 21/00
See application file for complete search history.

(56) References Cited

U.S. PATENT DOCUMENTS

| | | |
|---|---|---|
| 6,038,295 A | 3/2000 | Mattes |
| 6,819,982 B2 | 11/2004 | Doane |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 7,542,073 B2 | 6/2009 | Li et al. |
| 7,971,156 B2 | 6/2011 | Albertson et al. |
| 8,131,597 B2 | 3/2012 | Hudetz |
| 8,174,562 B2 | 5/2012 | Hartman |
| 8,199,747 B2 | 6/2012 | Rojas et al. |

(Continued)

FOREIGN PATENT DOCUMENTS

CA          2887596 A1          7/2015

OTHER PUBLICATIONS

US 10,656,660 B1, 05/2020, Meisenhoider et al. (withdrawn)

(Continued)

*Primary Examiner* — Michael D Lang
(74) *Attorney, Agent, or Firm* — Schwegman Lundberg & Woessner, P.A.

(57) ABSTRACT

A method for controlling movement of a drone is disclosed. A spatial vector between a flight-capable drone and a reference object is computed. The spatial vector defines a direction and a distance by which the drone is spaced from the reference object. Flightpath attributes based on the computed vector are determined. The flightpath attributes include one or more of a flight direction, a flight distance, and a flight speed. The flight direction is variable as a function of the direction of the spatial vector. The flight distance is variable as a function of the distance of the spatial vector. The flight speed is variable as a function of the distance of the spatial vector. In an automated operation, movement of the drone is controlled according to the determined flightpath attributes.

23 Claims, 12 Drawing Sheets

(56) References Cited

U.S. PATENT DOCUMENTS

| | | |
|---|---|---|
| 8,274,550 B2 | 9/2012 | Steuart |
| 8,332,475 B2 | 12/2012 | Rosen et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,225,897 B1 | 12/2015 | Sehn et al. |
| 9,276,886 B1 | 3/2016 | Samaranayake |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,705,831 B2 | 7/2017 | Spiegel |
| 9,723,272 B2 | 8/2017 | Lu et al. |
| 9,742,713 B2 | 8/2017 | Spiegel et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,102,423 B2 | 10/2018 | Shaburov et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,284,508 B1 | 5/2019 | Allen et al. |
| 10,370,118 B1 | 8/2019 | Nielsen et al. |
| 10,439,972 B1 | 10/2019 | Spiegel et al. |
| 10,501,180 B2 | 12/2019 | Yu |
| 10,509,466 B1 | 12/2019 | Miller et al. |
| 10,514,876 B2 | 12/2019 | Sehn |
| 10,614,855 B2 | 4/2020 | Huang |
| 10,748,347 B2 | 8/2020 | Li et al. |
| 10,768,639 B1 | 9/2020 | Meisenhoider et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2007/0250526 A1 | 10/2007 | Hanna |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2014/0254896 A1 | 9/2014 | Zhou et al. |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 | 2/2017 | Liu et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0225796 A1 | 8/2017 | Sun |
| 2017/0228690 A1 | 8/2017 | Kohli |
| 2017/0244937 A1 | 8/2017 | Meier et al. |
| 2017/0320564 A1 | 11/2017 | Kuzikov |
| 2017/0337791 A1 | 11/2017 | Gordon-carroll |
| 2017/0371353 A1 | 12/2017 | Millinger, III |
| 2018/0082682 A1 | 3/2018 | Erickson et al. |
| 2018/0246529 A1* | 8/2018 | Hu .................. G05D 1/0016 |
| 2019/0011921 A1 | 1/2019 | Wang et al. |
| 2020/0241575 A1 | 7/2020 | Meisenhoider et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0362848 A1 | 11/2021 | Spencer |
| 2021/0382503 A1 | 12/2021 | Meisenholder et al. |
| 2021/0382564 A1 | 12/2021 | Blachly et al. |
| 2021/0397000 A1 | 12/2021 | Rodriguez, II |

OTHER PUBLICATIONS

Meisenholder, David, "Remoteless Control of Drone Behavior", U.S. Appl. No. 15/640,143, filed Jun. 30, 2017, 108 pgs.

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

* cited by examiner

SPATIAL VECTOR-BASED DRONE CONTROL

PRIORITY

This application claims the benefit of priority of U.S. Patent Application Ser. No. 62/568,656, filed on Oct. 5, 2017, which is hereby incorporated by reference herein in its entirety

TECHNICAL FIELD

Embodiments of the present disclosure relate generally to control of aerial drones. More particularly, but not by way of limitation, the present disclosure pertains to drones, systems and methods that provide for automated determination of a drone flightpath.

BACKGROUND

An unmanned aerial vehicle (UAV) (also known as an aerial drone and occasionally referred to herein simply as a drone) often forms part of an unmanned aircraft system (UAS) that includes the drone, a remote control device, and a system for communication between the drone and the remote control device. Some systems provide for drone control by an operator without use of a remote control device.

Originally, drones where used primarily in military applications, but their use is expanding to commercial, scientific, recreational, agricultural, and other applications, such as policing, peacekeeping, and surveillance, product deliveries, aerial photography, drone racing, and more. Drones are often configured for relatively low-level flight, typically within viewing range of persons at ground level. Drones are typically intelligent machines with the ability to self-stabilize in air, and hold a GPS position. Many drones have multiple rotors that drive respective spinning propellers to generate lift, with a control system typically maintaining stability of the drone by varying the rotational speeds of the respective propellers.

BRIEF DESCRIPTION OF THE DRAWINGS

Various ones of the appended drawings merely illustrate example embodiments of the present disclosure and should not be considered as limiting its scope.

Figure 1:
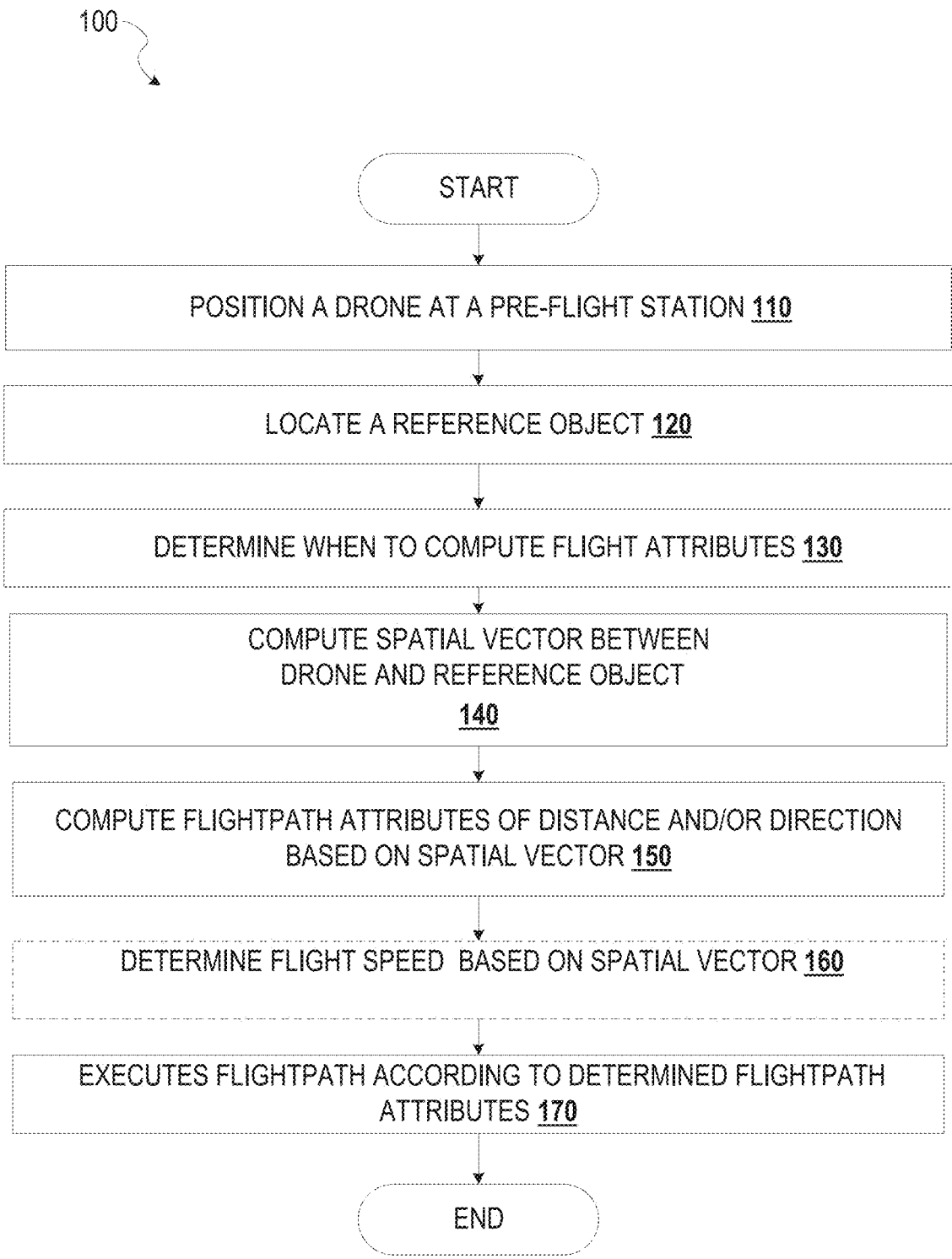
FIG. 1 illustrates a method for spatial vector-based control of drone movement, according to one embodiment.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drones can have varying degrees of autonomy. Drones can be operated by a human operator or can fly autonomously as directed by onboard computers. For example, drones can fly, hover or navigate without input from a pilot, i.e., autonomously. Some existing drones are controlled by a dedicated remote control device, which commonly is wireless. For example, drones are usually equipped with a receiver that receives instructions for movement or other action from a transmitter. The transmitter is operated by a user, and the transmitter and the receiver often communicate using radio frequencies. Communication between the drone and the transmitter or the remote control can be achieved by variety of technologies. Wi-fi provides the ability to transmit heavy amounts of data to and from the drone within a specific control radius compared to, for example. Bluetooth communication. Wi-fi and Bluetooth connections allow a remote control device to run on a tablet or smartphone, for example. There are mobile applications for viewing drone position using GPS, drone flight paths or other drone flight statistics such as speed, battery life, and fly time.

Thus, in a typical use case, for example, a user may place an aerial drone on the ground and interact with the remote control or mobile control device to launch the aerial drone, control flight maneuvers, and land the aerial drone. Accessories carried by the drone, such as cameras or speakers, may also be manipulated using the controller. Typically, remote devices operate within a predefined range, such as a radius around a user.

Controlling a drone using remote control devices rely on considerable skill and practice for effective operation by the user. An additional drawback is that it requires a user to carry not only the drone, but also the remote control device. Such remote control devices are subject to interference, battery and power supply limitations, etc.

Control methods that function without a remote control device include gesture control mechanisms, in which where the drone interprets operator gestures (e.g., facial or manual gestures) and, using computer vision, translates them into actions and movements. A disadvantage of such methods is that they tend to be unreliable due to user errors and variable environmental conditions. Instead of gestures, other commands such as voice or speech commands have been proposed for hands-free drone control. Yet another method for controlling drone movement without remote control device is to pre-program a flight path and, using GPS technology, the drone thereafter autonomously follows the pre-programmed flight path. However, preprogramming the flight path requires considerable effort to set up.

Despite the progress made in communication technology and processing capabilities of onboard computers of drones, those methods have drawbacks due to requiring additional computational resources, equipment, or skill and effort to set up. Embodiments and aspects of the present disclosure describe methods and systems for controlling movement of a remote device instead of or in addition to using a remote control device or a remoteless command channel such as voice or gesture commands.

According to one aspect of the disclosure, a drone control technique is provided in which one or more attributes (also referred to herein as metrics) of a flightpath to be followed by a drone is automatically determined based at least in part on a spatial vector defined between the drone and a reference object (e.g., a user of the drone). In some embodiments, one or more of the direction, distance and speed attributes of the drone's flightpath is determined based on a direction and a distance by which the drone is spaced from the reference object, so that the direction, size, and/or speed of the flightpath is variable with variation in the spatial vector. In some embodiments, various combinations of the direction, distance and speed can be determined based on the spatial vector. The reference object is an object relative to which the drone's position is determined in a three dimensional space. In one embodiment, the reference object may be a user or operator of the drone. The reference object may be defined more narrowly as a particular body part of the user (e.g., face, head, or hand), instead of the entire body of the user.

Such automated determination of one or more flightpath attributes based on the spatial vector between the drone and the reference object has a number of benefits. User interaction with the drone is simplified by automated determination of the relevant flightpath attributes. In some embodiments, the vector-based drone control technique enables or facilitates control of the drone in the absence of any physical controller, thereby reducing cost and improving convenience. A further benefit is that selection and control of the drone's route or flightpath is fast and intuitive relative to existing alternative techniques.

In some embodiments, the flight path of the drone for at least some purposes is wholly determined by a position of the drone relative to a focal point or reference object, being an object that serves as a point of reference for positioning of the drone in three-dimensional space. In one embodiment, a vector that expresses the direction and the distance between the drone and the reference object is computed. Such a spatial or geometric vector is not to be confused with velocity vectors or acceleration vectors that may in some instances be determined by use of motion sensors and/or accelerometers forming part of the drone.

The spatial vector between the drone and the reference object is herein also referred to as a "user-drone vector" in cases where the reference object is a human operator. As mentioned, the user-drone vector represents a position of the drone relative to the user. In one embodiment, flightpath attributes or metrics, such as a flight path and speed of movement of a drone, is computed based on the user-drone vector. Instead, or in addition, a shape of the flightpath may in some embodiments be dependent on the spatial vector.

In some embodiments the execution of automated flight behavior based at least in part on the user-drone vector may be performed by the drone without any triggering command issued by a that is the user, either via a remote control or via any command channel other than the spatial vector control mechanism. For example, initiation of the flightpath is in some embodiments triggered by stabilization of the user-drone vector for at least a predefined threshold period. One such embodiment provides for the drone to track movement of the user relative to the drone while the drone is hovering in a stationary position, to identify when the user stopped moving relative to the drone, to determine the user-drone vector responsive to identifying that the user has stopped, and thereafter automatically to commence a flightpath determined based at least in part on the user-drone vector.

In some embodiments, motion imparted on the drone itself may control a drone's launch flight path. The drone may react to movements imposed on the drone or movements of a reference object (e.g., the user) viewable through an image capture device coupled to the drone. For example, a user may toss the drone into the air like a flying disc. The drone may detect aspects of the toss including rotational motion and translational motion. The drone may then stabilize or correct a flight path and position itself at a starting point for the maneuvers. The drone may then execute the maneuvers and land or await further input from the user. Once the drone stabilizes and assumes a pre-flight position, a user-drone vector may be computed, according to one embodiment. The drone may execute maneuvers as determined based on the user-drone vector.

In other embodiments, determination of the user-drone vector and initiation of flight based on the user-drone vector may be triggered by an explicit user command. Such a trigger command can in some embodiments be communicated via a command channel such as by use of a remote control, by hand gesture, by facial gesture, by voice command, or by any other appropriate command channel.

FIG. 1 shows method 100 for spatial vector-based control of drone movement, according to one embodiment. At 110, a drone is positioned at a pre-flight station, such as a starting position in space. There are number of ways of how a drone can be launched and how the drone detects when to reposition itself so as to assume a starting position. For example, in one embodiment, the drone may detect when it is no longer in contact with the human skin, such as when a human operator removes a palm holding the drone. Alternatively, the drone may detect the downward acceleration resultant to release of the drone, which triggers the propellers and causes the drone to self-position by hovering in place. In another example, if thrown or tossed in the air, the drone may stabilize itself and continue hovering. In yet another embodiment, the drone may receive a command such as from a remote control device, a gesture, or a voice command to assume a starting position. In one aspect of motion-controlled operation, at least one initial operation of a drone may be controlled based on an initial motion of the drone imparted by a user. For example, an initial toss, roll, or spin may cause the drone to perform operations determined from aspects of the initial motion.

At 120, a reference object is located. The reference object is the focal point or object relative to which the spatial vector is defined. In some embodiments, the reference object may be a human operator that controls the drone movement. In one embodiment, the reference object is located by the drone. There are a number of ways for the drone to locate the reference object and therefrom calculate a spatial vector between the reference object and the drone. Real-time calculation of the user-drone spatial vector is an operation that may include user identification and tracking, such that the drone identifies a specified user (or body parts of the user) as an operator. Further, the drone may adjust the calculated flight path in case of obstacles along the flight path. For example, a drone may complete a calculated flight only if no risk of collision is detected. Obstacle avoidance is an optional function of the described methods herein.

In one embodiment, computer vision may be used. For example, the drone may carry a camera and by processing captured images, the drone may identify a human operator's face, eyes, body, etc. A camera or image capture device of the drone may continuously capture a video feed in which the operator is present. The video feed captured by the camera is processed on-the-fly by an onboard image processor of the drone to recognize a face, a body, a clothing selection, or other distinguishing characteristics or aspects of the operator. The image processor may identify facial movements, body movements, or other gestures of the operator in some embodiments. The camera may have a wide angled lens configured for providing a viewing range of 360° around an operatively upright axis, and greater than 180° in both remaining axes orthogonal to the upright axis. This wide angled camera may be mounted on a lower side of the drone body, thereby to continuously capture substantially everything below and at the vertical level of the drone, in use. A 360° camera may consist of multiple camera sensors and may generate a full spherical image around the drone.

Usually, a line of sight is necessary for an approach relying on computer vision for detecting the reference object. In some embodiments, the drone determines the distance between itself and the user by processing image content captured by its onboard camera, to generate depth information from which an estimation is made of the direct line distance between the drone and the user. In a more specific embodiment, the drone may carry two or more cameras in a stereoscopic arrangement, using triangulation between the two or more cameras and the reference object to determine the distance between the object and the drone. This approach is also known as a stereoscopic vision. In yet another embodiment, the user may carry a beacon such as a mobile device, a tablet, a smart phone, or other transmitter of signals directed to the receiver of the drone. This approach does not require line of sight but requires an additional element to be carried, i.e., the beacon. In other embodiments, sensors can be used to detect the reference object. Non-visual methods for determining relative location between two objects include, but are not limited to, signal triangulation (such as based on WiFi, Bluetooth low energy, radio etc), heat signatures, etc.

Once the reference object is located, it is determined when to compute flightpath attributes at 130. In one embodiment, the drone waits for a pre-determined amount of time to compute the spatial vector between the drone and the reference object. In another embodiment, the drone waits until the reference object is not moving. Various methods can be used to trigger computation of the flightpath attributes.

At 140, a spatial vector is computed by calculating the direction and the distance by which the drone is spaced from the reference object. As mentioned above, the drone can use computer vision including stereoscopic vision, beacons, and other sensors to locate the object and determine direction and a distance by which the drone is spaced from the reference object. Further, the drone is equipped with accelerometers, altimeters, and gyroscopes that allow the drone to determine its position in space relative to the reference object and further to determine and follow a flight path according to flightpath attributes.

At 150, the drone determines flightpath attributes based on the spatial vector. In this embodiment, the attributes calculated at 150 includes a flight distance and a flight direction. In some embodiments, at 160, the drone also determines a flight speed based on the computed spatial vector. In one embodiment, the flight speed is a function of the flight distance according to the spatial vector. For example, if the flight distance increases, then the flight speed also increases in proportion to the flight distance increase. E.g., if the flight time is predetermined and is a constant, then an increase in the distance of the flight path causes a corresponding increase in the flight speed. In other embodiments, flight speed may be calculated based on the spatial vector, independent of any variation in flightpath size.

Upon determining the flightpath attributes based on the spatial vector, at 170, the drone executes a flight path according to the determined instructions. For example, the drone may fly the same distance that is the distance between the drone and the reference object in a direction opposite to the object reference, according to the computed direction between the drone and the object, as illustrated and described in relation to FIG. 2 and FIG. 3. It will be appreciated that FIG. 3 is a two-dimensional schematic drawing illustrating a vertical plane in which both the user and the drone lies, so that the user-drone vector is described by its scalar length and an elevation angle (being the included angle between the user-drone vector and the horizontal). In three dimensional space, however, the direction of the user-drone vector is in this example embodiment defined by a combination of the elevation angle and an azimuth angle (being an angle of rotation about a vertical axis centered on the user).

Figure 5:
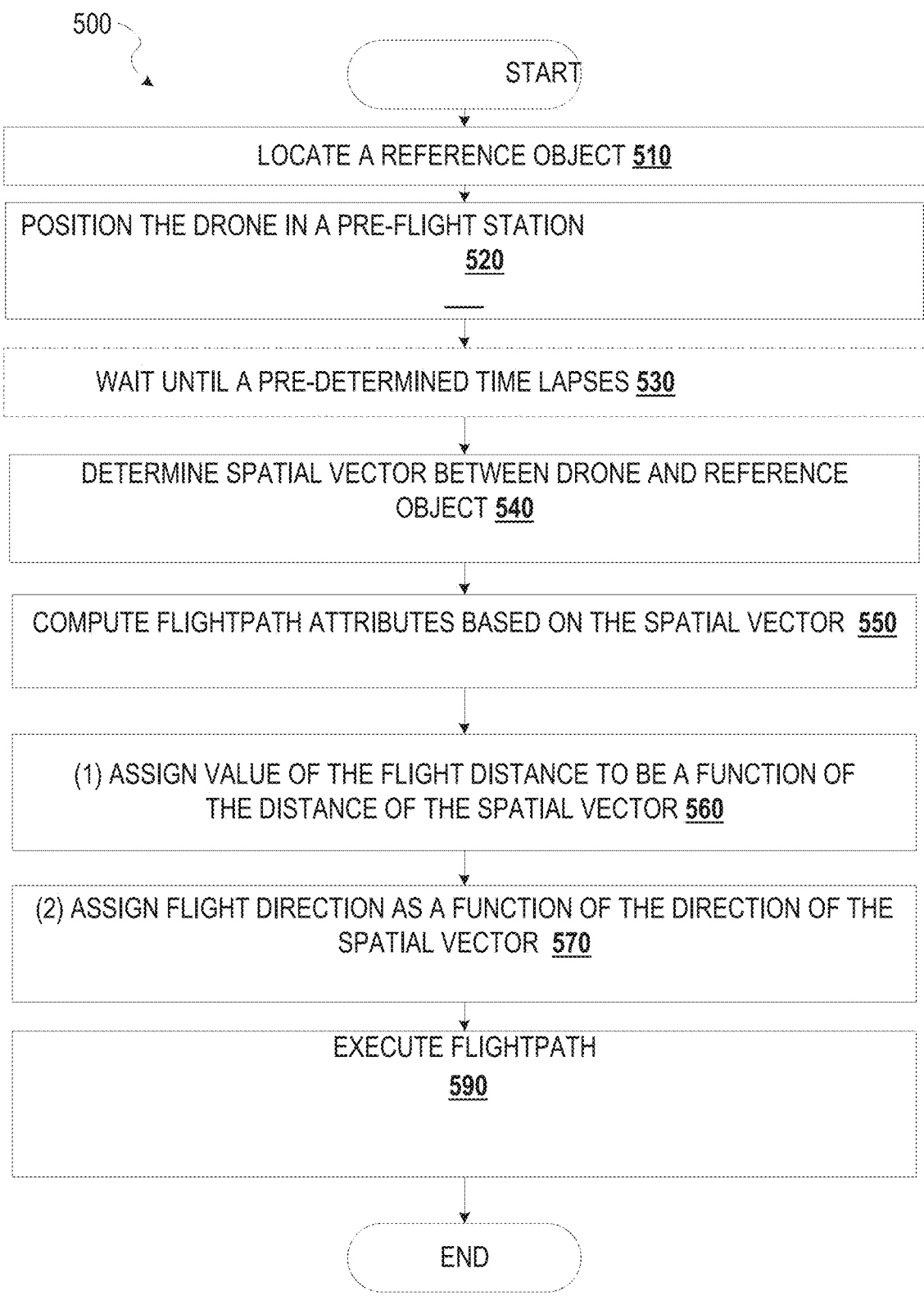
FIG. 5 illustrates a process for spatial vector-based movement control of a drone, where the drone flies in a direction towards and passes over or around the reference object, according to one embodiment.
Figure 6:
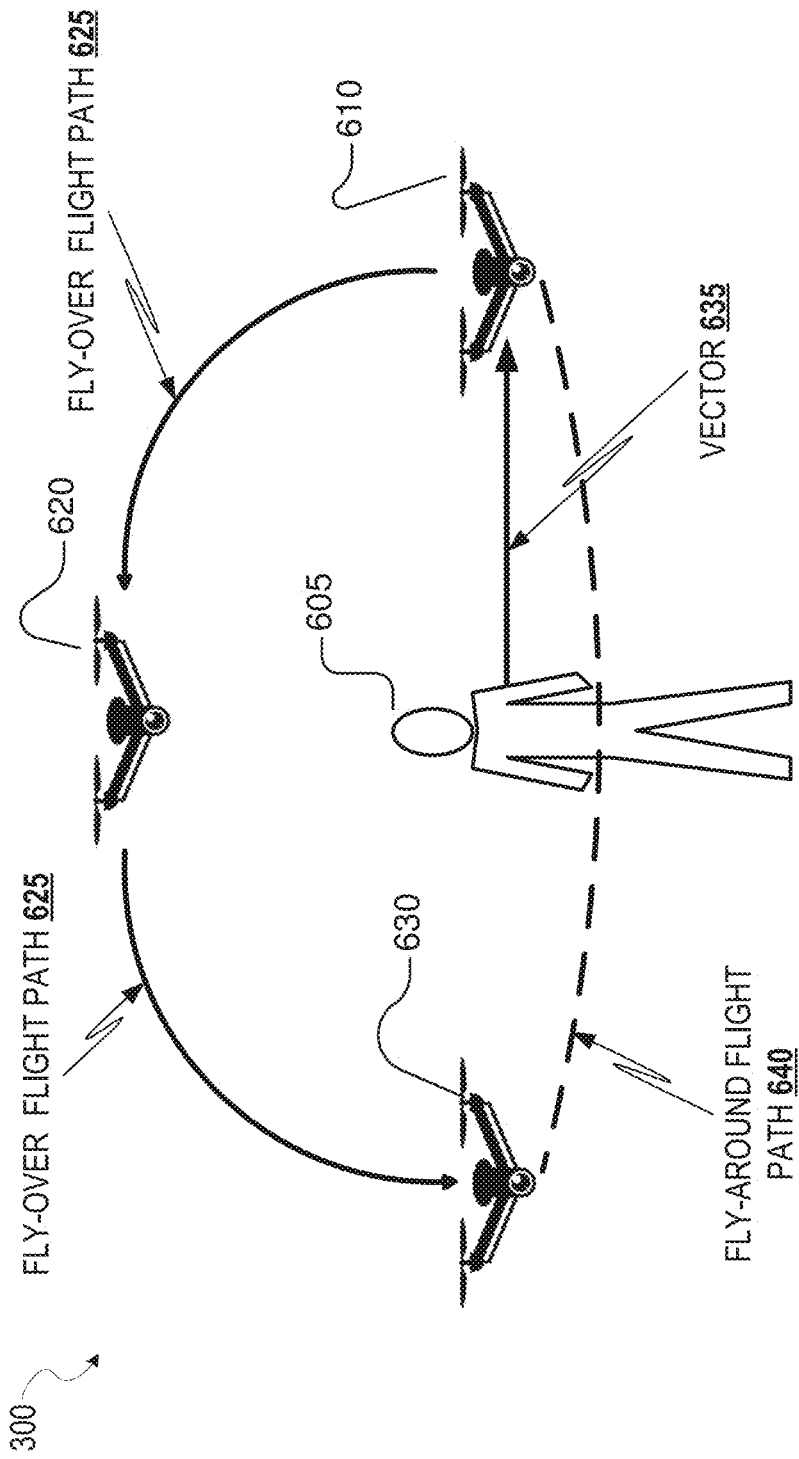
FIG. 6 illustrates a fly-over flight path and a fly-around flight path as determined by process 500 illustrated in FIG. 5.

In another embodiment, the drone may fly in a direction towards the reference object and then towards a target object, according to the computed spatial vector, as illustrated by fly-over flight path 625 in relation to FIG. 5 and FIG. 6. In yet another embodiment, the drone may fly around the reference object according to the computed spatial vector, as illustrated by fly-around flight path 640 in relation to FIG. 5 and FIG. 6. In yet another embodiment, the drone may fly away from the reference object but instead of an a straight line (as illustrated in FIG. 2 and FIG. 3), the drone may fly in a curved line or arc according to the computed spatial vector as illustrated, for example, by flight paths 725 and 745 in relation to FIG. 7.

Figure 2:
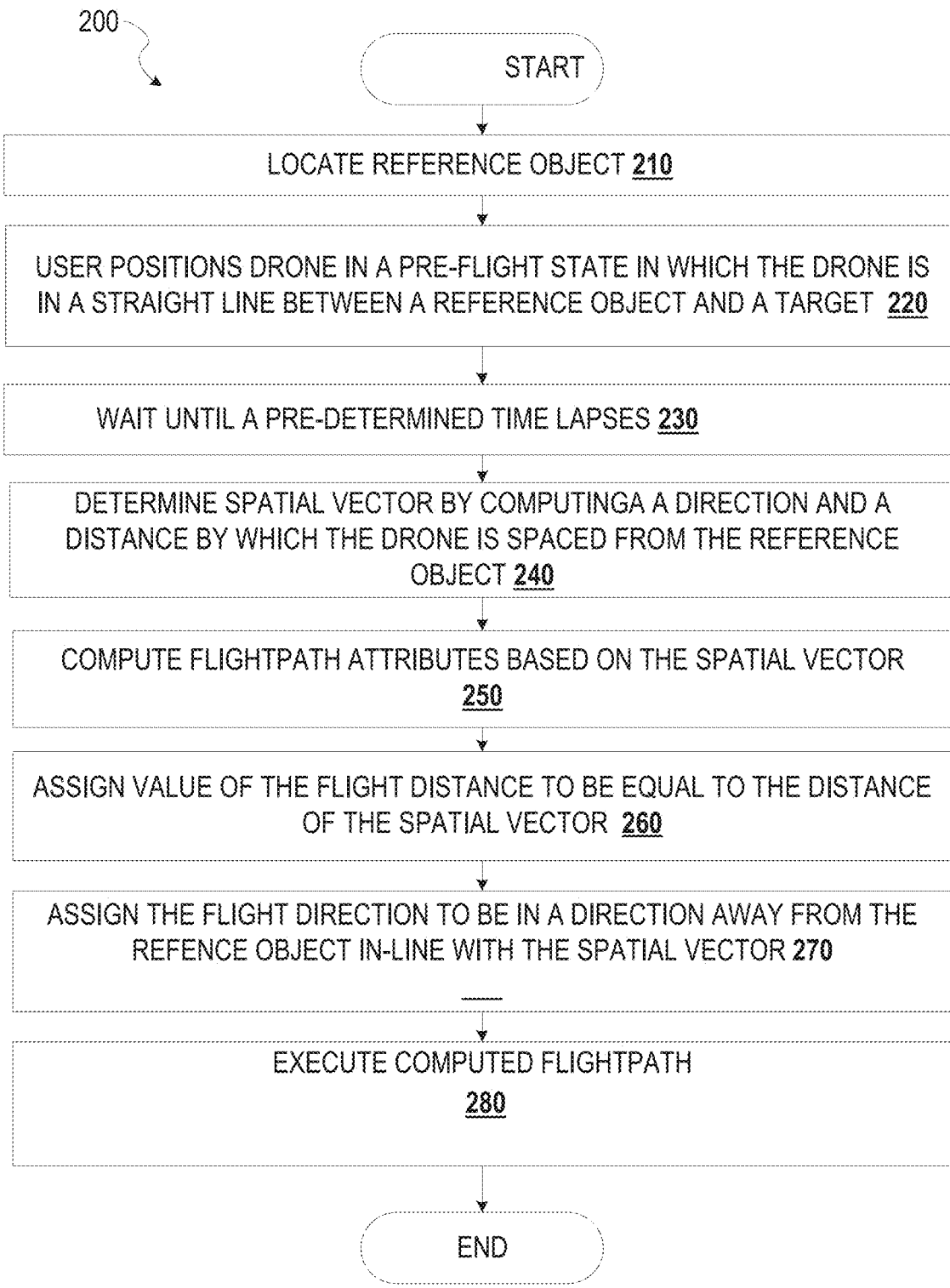
FIG. 2 illustrates a method for spatial vector-based control of movement of a drone, where the drone flies in a direction opposite to a reference object, according to one embodiment.
Figure 3:
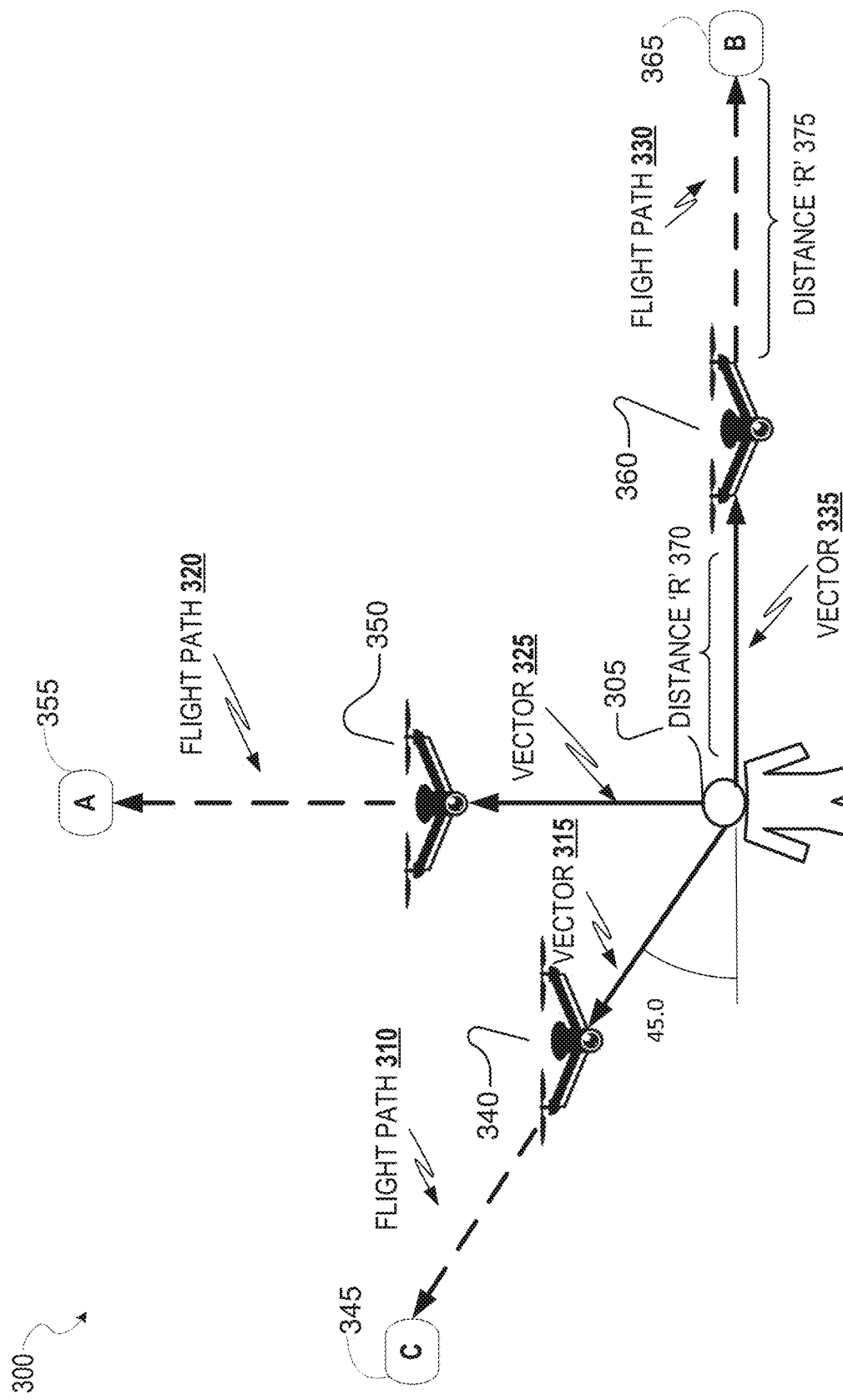
FIG. 3 illustrates exemplary flight paths computed according to the process 200 illustrated in FIG. 2, according to one embodiment.

FIG. 2 illustrates a process 200 for a spatial vector-based control of movement of a drone, where the drone flies in a direction opposite to the reference object (in this example, a user 305, FIG. 3), according to one embodiment. At 210, a reference object is located. At 220, the drone positions in a pre-flight state in which the drone is in a straight line between the reference object and a desired location or other object of interest. For example, the operator who controls movement of the drone and who is in this example the reference object may position itself in a relatively straight line from a target such that the drone is in a position between the operator and the target along the straight line. In one embodiment, the drone waits until a pre-determined time lapses, at 230. This is one example for a condition under which spatial vector computation and subsequent movement is triggered. Others, as mentioned above include detection of when a drone is released, indicating that the drone is in the air.

At 240, the drone determines a spatial vector by computing the direction and the distance by which the drone is spaced from the reference object. Based on the spatial vector, at 250, the drone computes flightpath metrics or attributes, in this example consisting of a flight distance and a flight direction. In one embodiment, the flight metrics also includes a flight speed. At 260, the flight distance is assigned to be equal to the distance of the spatial vector (i.e., the scalar value of the spatial vector). At 270, the flight direction is assigned to be in a direction away from the reference object according to the direction of the spatial vector i.e., the flight bias direction is in-line and parallel with the spatial vector, traveling away from the reference object. Upon computing the flight metrics based on the spatial vector, at 280, the drone flies in a direction away from the reference object for the assigned distance equal.

FIG. 3 illustrates three flight paths 310, 320, and 330 depending on computed user-drone vectors from three different drone positions 340, 350 and 360, respectively. FIG. 3 is two-dimensional schematic drawing illustrating a vertical plane in which both the user and the drone lies, so that the user-drone vector is described by its scalar length and an elevation angle. In one embodiment, vectors 315, 325, and 335 are computed based on process 200, i.e., flight paths 310, 320, and 330 are in a direction away from the reference object (in this case a human user or operator). In this example, the operator 305 is positioned such that the drone is between the operator and target object or location such as positions 'A' 355, 'B' 345, and 'C' 365. In one embodiment, the operator, the drone and the target location are positioned in straight line, as illustrated by vector 335 and flight path 330; vector 325 and flight path 320; and vector 315 and flight path 310, respectively. Note that the targets A, B and C denote approximate target locations for the extremities of the flightpaths, as identified or selected by the operator 305.

In the illustrated example, position 350 of the drone is right above the operator 305 at an elevation angle of 90 degrees. In one embodiment, the operator 205 may throw the drone in the air and the drone may assume pre-flight position at position 350. The height of the preflight position may be determined by the initial velocity of the launch throw. Once the drone stabilizes and waits 10-15 seconds to lapse, an on-board computer may calculate vector 325 and determine and assign flightpath attributes according to vector 325. Thus, in this example, the determined flight path 320 is in a direction directly away from operator 305 according to the direction of vector 325, as illustrated by the dotted arrow of vector 325. For example, the flight path 320 is the route from position 350 to position 'A' 355 in a direction along the direction of the vector 325. Thus, if operator 305 throws the drone above his head at position 350, according to process 200, the drone will pause for the predetermined 15 seconds and will then fly even higher above his head to position 'A' 355. The drone will fly the same distance as is the distance between the drone in position 350 and operator 305 according to vector 325, in one embodiment. In this example, the distance between drone position 350 and position 'A' 355 is equal to the distance between drone position 350 and position of the human operator 305. In other embodiments, the distance of the flightpath 320 can be smaller or greater than the scalar value of the spatial vector 325.

Position 360 of the drone is right next the operator 305 along the horizontal axis at an elevation angle of 0 degrees, as illustrated. The user-drone distance is the distance 'R' 370 between operator 305 and drone in position 360. In one embodiment, the operator 305 may hold the drone in the palm and release the drone by moving away his palm from underneath the drone. Operator 305 may move away from the drone and when operator 305 stops moving and the drone has assumed pre-flight position at position 360, an on-board computer may calculate vector 335 and determine and assign flight metrics according to vector 335. In this example, the determined flight path 330 is in a direction away from operator 305 along the horizontal axis at an elevation angle of 0 degrees, as illustrated by the dotted arrow according to vector 335. For example, the flight path 330 is the route from position 360 to position 'B' 365 in a direction away from operator 305 along the horizontal axis at an elevation angle of 0 degrees. The flight path 330 has distance 'R' 375 equal to the user-drone distance 'R' 370 as represented by vector 335. If operator 305 leaves the drone at positon 360, according to process 200, the drone will fly further away to position 'B' 365, keeping the altitude along the horizontal axis in a direction opposite of operator 305, according to the direction of vector 335. The drone will fly the same distance 'R' 375 as is the distance 'R' 370 between the drone in position 360 and operator 305 according to vector 335. In this example, the distance between drone position 360 and position 'B' 365 is equal to the distance between drone positon 360 and position of the human operator 305. In other embodiments, the flightpath distance may be greater or smaller than the size of the spatial vector 335.

In the illustrated example, position 340 of the drone is at a level higher than the operator 305 at an elevation angle of 45 degrees, as illustrated. In one embodiment, the operator 205 may throw the drone in the air and the drone may assume pre-flight station at position 340 based on the direction and initial velocity of the throw. Once the drone stabilizes and waits 10-15 seconds to lapse, an on-board computer calculates vector 315, after which it determines and assigns flight metrics or attributes based on the vector 315.

In other embodiments, instead of waiting a pre-determined amount of time, the drone triggers vector calculation differently from that described above with reference to FIG. 1. In this example, the determined flight path 310 is in a direction away from operator 305 in-line with the vector 315, i.e., at an elevation angle of 45 degrees relative to the human operator 305, as illustrated by the dotted arrow representing flightpath 310. Flight path 310 is the route from drone position 340 to position 'C' 345, which is also referred to herein as the relevant target position. Thus, if operator 305 throws the drone in the air at position 340, according to process 200, the drone will fly even higher in the direction of vector 315 from position 340 to position 'C' 345. The drone will in this example automatically fly the same distance as the spatial vector 315, that is, the distance between the drone in position 340 and operator 305. In this example, the distance between initial drone position 340 and position 'C' 345 is equal to the distance between drone position 340 and position of the human operator 305. In other embodiments, the distance may be greater or smaller.

In some embodiments, only one of the direction and the scale/size of the flightpath is based on the spatial vector.

In one embodiment, the human operator 305 may control movement of the drone by moving, e.g., walking on the ground. The operators' movements trigger automatic computation, in real-time, of the user-drone vector and flight metrics based on the user-drone vector. This method of controlling the drone has a number of advantages including that it does not require sophisticated skills, does not require a physical controller (but does not exclude the possibility of using a controller either), and allows for both user-friendly and fast planning of the flight route of the drone. The vector-based controlling of the drone's flight route is intuitive and simple.

Figure 4:
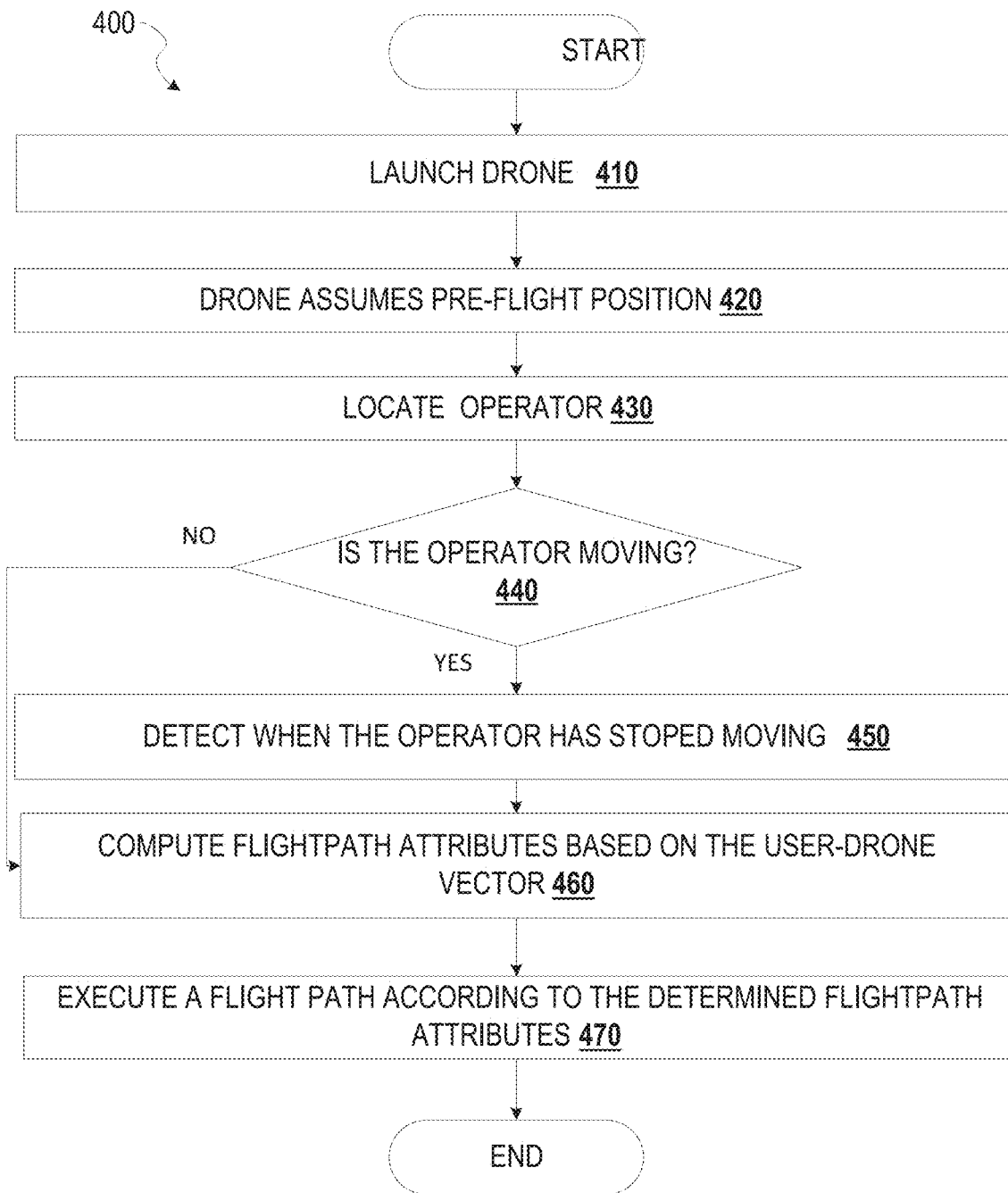
FIG. 4 illustrates a process for controlling a drone's movement in response to movements of a reference object, according to one embodiment.

FIG. 4 illustrates a process 400 for controlling a drone's movement in response to movements of a reference object. In some embodiments, the drone may be camera-enabled with one or more cameras mounted on the drone. In one embodiment, the user is detected by the one or more drone cameras. The cameras may be used to track movements of the user. In one embodiment, the drone may be configured to various flightpath automatically based on user movement. For example, if the user wants the drone to reach a particular vantage point, the user positions herself in a straight line from the desired vantage point such that the drone is located between the user and the vantage point along the straight line, according to one embodiment. The drone then, automatically and in real-time, computes a route, and flies to the vantage point in a direction opposite to the user. In one embodiment, the drone may fly in a straight line. In alternative embodiments, the drone may be configured to fly in a curved line, such as an arc, towards an object of interest or the vantage point. For example, the drone in some embodiments follows a horizontal or vertical arc around or above the reference object.

Example embodiments for flight paths based on curved lines instead of straight are described in relation to FIG. 6. The drone may be operable to function in a vector-based drone control mode exclusively or, in other embodiments, the drone may be switchable between various modes of operation and control. For example, after launch the drone may be switched from one mode of operation to a different one using a number of techniques. The drone may be instructed to switch modes of operation in response to gesture commands, time period lapse, voice commands, or commands transmitted via a remote control device. The various modes can be switched on and off during a flight or, alternatively, the drone may be pre-configured to operate in a given mode exclusively during the duration of the flight.

One example non-vector mode of operation which the drone may be switchable is a "follow me" mode in which the drone is configured to automatically identify and track the operator while the operator is moving. Thus, the drone may be configured to automatically center on or otherwise track a particular user identified as operator of the drone. The drone may be configured to automatically maintain a predetermined distance between the drone and the operator, according to one example. Another exemplary mode of operation is when the drone is configured or operable to keep the operator within the field of view of the one or more mounted cameras. The operator may be automatically identified by the drone by processing a video stream or still images captured by on-board cameras mounted onto the drone. The operator may be identified among a number of other subjects by facial recognition, object recognition (e.g., to recognize a predefined visual identifier associated with the operator), or automated feature recognition to identify a distinctive visual feature associated with the operator (e.g., a particular color of clothing or visually distinctive object such as a control wand or wristband). In one example embodiment, for instance, the drone is configured to automatically, upon manual launch, identify the operator, identify at least one distinctive visual feature of the operator (e.g., a distinctly colored article of clothing worn by the operator), and thereafter automatically to track the operator based on automated recognition of the distinctive visual feature.

Video or image based identification of an operator such as that described above can in some embodiments be performed to facilitate vector-based control of the drone, in some instances facilitating vector-based and other modes of drone control. In one such embodiment, the drone may be controllable by hand, body, and/or facial gestures of the operator. In such cases, on-the-fly identification and targeting of the person designated as operator of the drone (to the exclusion of such other persons as may be present) may serve to ensure that the drone camera is substantially continually trained on the operator.

In one embodiment, triangulation between two cameras and the operator may be used to determine the distance between the operator and the drone. Thus, depth information may be obtained in real-time using stereoscopic vision, thereby enabling the drone to detect its position in space relative to the user or other reference object.

An auxiliary camera may be incorporated in the drone in addition to a primary camera to allow stereoscopic vision. The auxiliary camera may in some embodiments be configured and oriented to substantially continually capture a video stream in which the operator is visible. In one example embodiment, the auxiliary camera is a wide angled camera, for example having a viewing angle of greater than 150° in two orthogonal directions. The viewing angles of the auxiliary camera may in some embodiments be approximately 180°, or greater. In a particular example embodiment, such a wide angled auxiliary camera is mounted on an operatively lower side of a drone body, so that the auxiliary camera effectively captures visual information on everything lower than the level of the drone in flight. In some embodiments, two or more auxiliary camera is may be provided to capture video imagery for operator identification. In one embodiment, wide-angled cameras may be positioned on opposite sides of the drone body, for example to capture video at composite viewing angles of substantially 360° in both orthogonal directions.

The auxiliary camera may be fixedly mounted on the drone body, to have a fixed orientation relative to the drone body. Instead, the auxiliary camera may be movably mounted on the drone body, the drone including an automated tracking system configured to dynamically move the auxiliary camera so as to track the person and/or the face of the operator. The auxiliary camera is in such embodiments locked on to the face or person of the operator, and remains focused on the operator regardless of the movement of the drone. Such automated tracking may be achieved in some embodiments by automated facial and/or object recognition based on the video stream captured by the auxiliary camera itself. In other embodiments, the operator may be tracked based on a beacon device carried by the operator and/or based on location information automatically communicated from a mobile user device (e.g., a mobile phone enabled with local/global positioning system functionality) to the drone by means of a communication link between the mobile device and the drone.

Other modes include when the drone is configured to automatically return to a specific homing location. The homing location may correspond to the operator's current location. The operator's location may be detected by automated image processing such as object or facial recognition performed in real-time based on image data captured by the one or more cameras mounted onto the drone. In some embodiments, the vector-based mode of control can operate in addition or as an alternative to any of the above-mentioned modes of operation.

Turning now to FIG. 4, therein is shown a method 400 for vector-based control of drone flight path based on initial or priming user movement. At 410, the drone is launched. In various embodiments, upon launch the drone may be configured to perform a pre-configured type of flight path. In some embodiments, the drone is configured to perform an automated 'fly-around' flightpath, in which the drone follows a horizontal arc around a focus point (e.g., the operator or launcher). The arc in some embodiments comprises a full rotation, so that the drone flies substantially 360° around the focus point. The size of the arc may be determined by the scalar value of the spatial vector. The drone may additionally be configured automatically to return to the operator after performing the fly-around subsequent to launch. The drone can in one example embodiment automatically capture a video clip during the fly-around, or may in some embodiments automatically capture a sequence of digital images during the fly-around. Such image-capture is in some embodiments automatically focused on the operator.

Instead, or in addition, the drone is in some embodiments configured to perform an automated 'flyover' (see, e.g., FIG. 6), in which the drone follows an arc in an upright plane around a focus point (e.g., the operator). The flyover arc is in some embodiments a full flyover, so that drone flies substantially 180° around the focus point. Automated return behavior and image-capture behavior of the drone may be similar to that described above with reference to the fly-around flightpath. As before, the size of the arc is based on the scalar value of the spatial vector. In some embodiments, the radius of the arc may be variable based on the spatial vector. Instead, or in addition, the particular proportion of the full arc that is followed by the drone may be automatically variable based on the size of the spatial vector.

A further example automated flightpath that can be executed by the drone in some embodiments includes an 'overhead shot' (see, e.g., flightpath 320, FIG. 3), in which the drone automatically flies to a vantage point substantially vertically above the operator, and captures an image from the overhead vantage point. The height of the vantage point is in some embodiments automatically determined based on the scalar value of the spatial vector.

A particular flightpath type may be selected by a user preflight or in-flight via any of a variety of command channels. In addition to conventional remote control, a nonlimiting set of example command channels and flightpath types are discussed in the U.S. patent application Ser. No. 15/640,143, filed Jun. 30, 2017 and titled "REMOTELESS CONTROL OF DRONE BEHAVIOR," which is incorporated herein by reference in its entirety.

After a particular flightpath type is selected using one of the command channels (or, absent such a selection, the drone is set to perform a default flightpath or repeat the immediately preceding flightpath), the drone may then, at 420, assume a pre-flight position. In some embodiments, the drone may switch from one mode of operation to the vector-based mode of control, for example, the drone may switch to vector-based control after performing any of the above automated predetermined flightpaths or any combination thereof, upon which the drone assumes the preflight position.

Once the drone assumes a pre-flight position while it is in the vector-based control mode, an operator is located, at 430. As discussed above, a number of alternative techniques may be used for identifying and/or locating the drone, including using sensors, computer vision, and beacons. In other embodiment, the drone may locate the operator even before assuming the pre-flight position but prior to or while performing any of the pre-determined flightpaths described above.

At 440, upon locating the operator, a check is performed to determine whether or not the operator is moving. If the operator is moving, the drone waits until the drone detects that the operator has stopped moving, at 450. When the drone is no longer moving, the drone automatically computes, at 460 flightpath attributes or metrics based on the user-drone vector. In this example, operation 460 includes computing a flight distance and a flight direction for the flightpath which is to be performed. In one example, the distance to be travelled by the drone is equal to twice the distance between the drone and the user (i.e., twice the scalar value of the spatial vector). For example, the drone in one embodiment travels towards the operator. passes over the operator, and continues traveling an equal distance away from the operator. Such example flight paths such as fly-around and fly-over flight paths are described in relation to FIG. 6.

The computed flight direction is in some embodiments determined to be a function of both the azimuth angle and the elevation angle between the drone and the user according to the user-drone vector. The direction in one example is along the computed user-vector in a direction opposite of the operator. In other embodiments, the drone may be configured to fly towards the operator instead of opposite of her. In one such case, the drone may maintain its altitude and make an arc around the operator along the horizontal axis, (e.g., performing a fly-around flight path 640 illustrated in FIG. 6). In other cases, the drone may change the altitude and fly above user making an arc above the user, such as fly-over flight path 625 illustrated in FIG. 6. The specific flightpath attributes, such as the size of the arc, are on a specific pre-determined formula, but instead is based on the distance between the user and the drone, and may in some instances be dependent, at least in part, on the azimuth and or the elevation angles between the user and the drone. Upon determining the flight metrics according to the user-drone vector, the flightpath is executed using the computed size and/or direction attributes. Thus, the drone movement is controlled by the user by simply moving around on the ground thereby simplifying drone control.

FIG. 5 illustrates a process 500 for a vector based movement control of a drone in which the drone flies away from a reference object, in this case the operator, according to various embodiments. At 510, the reference object is located. At 520, the drone is positioned in a pre-flight state such that the reference object is along a straight line between a target position (also referred to simply as the target) and the drone. For example, the operator who controls movement of the drone and who is in this example the reference object may position himself in between a target and the drone. In one embodiment, the drone waits until a pre-determined time lapses, at 530. This is only one example for a condition under which vector computation and subsequent movement of the drone is triggered. Other techniques that can be used instead are mentioned above.

At 540, a spatial vector is determined by computing a direction and a distance by which the drone is spaced from the reference object. Based on the vector, at 550, the drone computes flight metrics/attributes including at least a flight distance and a flight direction. In one embodiment, the flight metrics may include also a flight speed. At 560, the value of the flight distance is assigned to be a function of the distance of the spatial vector. For example, with respect to the embodiment illustrated in FIG. 3, the distance from the user to the drone in a straight line direction is assigned to be the flight distance. In some embodiments, the flight distance may be set as a portion of an arc having the spatial vector as radius, with the portion of the circle being variable with variation in the size of the spatial vector At 570, the flight direction is assigned as a function of the direction of the spatial vector. In the example of FIG. 3, the flight direction is directly away from the operator. It will be appreciated that more complex or involved flightpaths may be employed in other embodiments in which the spatial orientation of the flight path is determined based at least in part on the direction of the spatial vector.

In one embodiment, drone can be assigned the flight direction to be in a direction towards the reference object and over the reference object to reach the location or object of interest. In another embodiment, the assigned direction may be around the reference object in a half-circle, for example, on the other side across the object. Upon computing the flight metrics based on the vector, at 590, the drone flies in a direction assigned at steps 570 and 580, as illustrated, for example, by fly-over flight path 625 and fly-around flight path 640 in FIG. 6.

Figure 7:
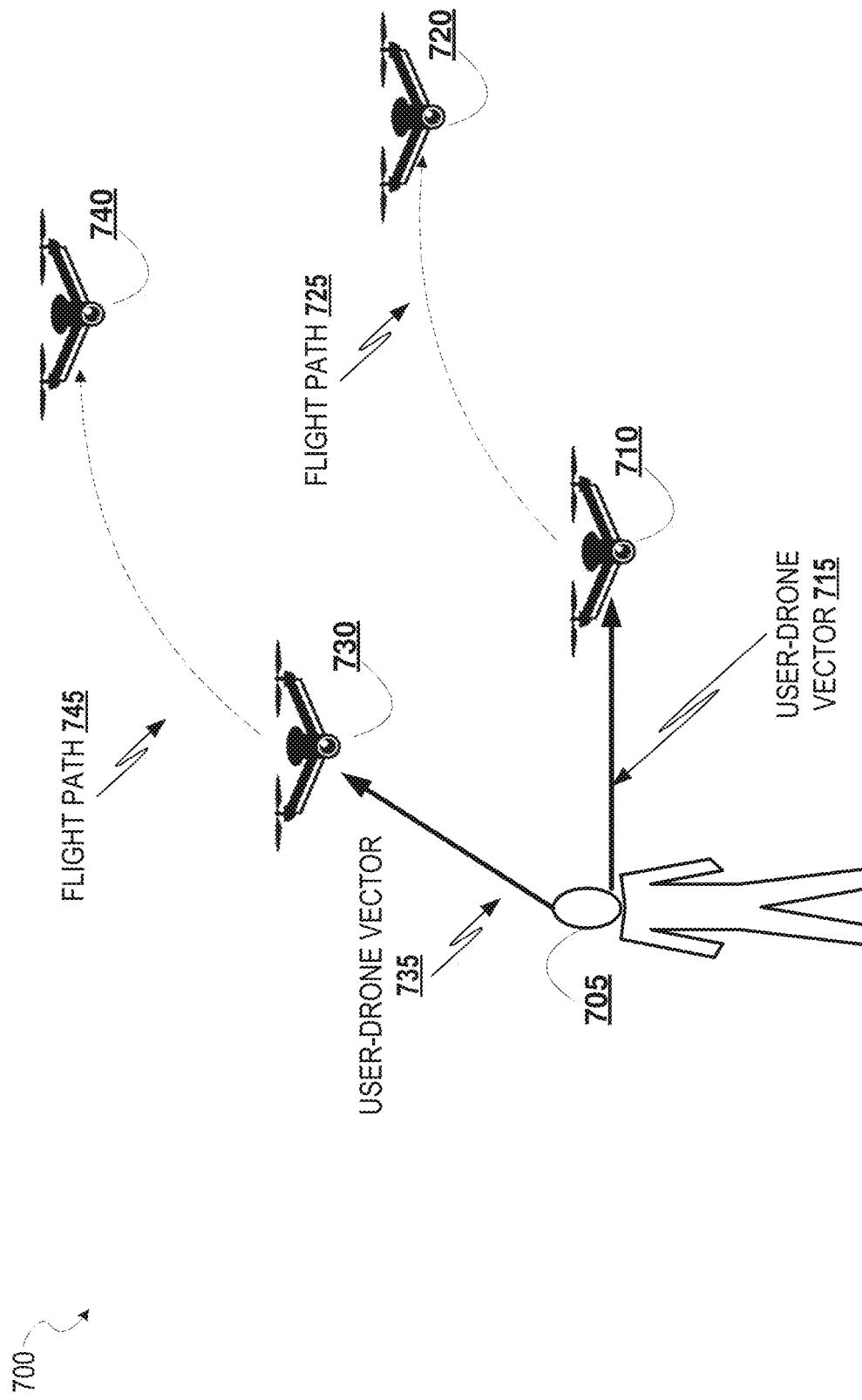
FIG. 7 illustrates further exemplary flight paths, where the flight routes are respectively along a curved line and in a direction opposite of a reference object, according to one embodiment.

FIG. 7 illustrates two exemplary flight paths 745 and 725 in which the direction of flight is determined by the initial spatial vector, and in which the scalar value of the spatial vector changes during execution of the flightpath. In these instances, the flight route is in a direction opposite of a reference object but along a curved line instead of a straight line, according to one embodiment. Flight paths 745 and 725 are variation of flight paths 330 and 310 illustrated in FIG. 3, the creation being that the line along which the drone travels is not straight, but is a curved line. In these embodiments, user-drone vectors 715 and 735 are computed based on process 500, where the flight direction is opposite to a reference object. In one embodiment, user-drone vectors 715 and 735 are calculated in relation to the reference object which is a human operator 705. In one embodiment, the operator positions himself between the drone and a target location, such as drone locations 740 or 720. It will be appreciated that these target locations may be vantage points from which video content is to be captured. Instead, video content may be captured en route to the target locations. Direction and distance of flight path 725 are determined based on computed user-drone vector 715. Similarly, direction and distance of flight path 745 are determined based on the computer user-drone vector 735. In this case, the larger the initial vector, the longer the flightpath.

FIG. 6 illustrates two exemplary flight paths such as fly-over flight path 625 and fly-around flight path 640, wherein the one or more attributes of the flightpaths are determined by an initial spatial vector between the drone and operator 605. The pre-flight starting position of the drone is drone position 610, according to one embodiments.

In one embodiment, the operator positions himself between the drone and a point of interest such as between current drone location 610 and target drone location 630. According to one embodiment, the drone instead of flying in a direction opposite to operator 605, may fly over the head of the operator to drone position 620, and from there completing the half circle to drone position 630, forming an arc represented by fly-over flight path 625 (as illustrated by the two solid arrows). In one embodiment, each of drone positions 610, 620, and 630 may be equal distance from the operator 605. In another embodiment, drone positions 610 and 630 may be equal distance from the operator 605 but when the drone flies over the head as in drone position 620, then the distance from the operator may be shorter, for example, the drone moving along a half-eclipse instead of a half circle. In some embodiments, the shape and direction of the curved line followed by the drone doing either the flyover or the fly around of FIG. 6 may be variable depending on the size of the spatial vector. For example, a shorter spatial vector may automatically result in a fly around or flyover flightpath that has a coach or greater than that of a circle, while a longer spatial vector may automatically result in a flatter flight curve.

When the planned route is over the operator as illustrated by the fly-over flight path 625, then the camera tracking the user may adjust such that the camera can capture 360° view. The distance from the user to the drone may be maintained along fly-over path 625 or, alternatively, the distance may be shortened or even lengthened. According to fly-over flight path 625, the drone changes altitude and moves along the vertical plane parallel to a vertical axis along the height of the operator. According to the computed vector 635, the fly-over flight path 625 may be a function of the distance between the drone in position 610 and the operator 605. For example, if 'r' represents the distance between the drone in position 610 and the operator 605, the fly-over flight path 625 may be equal to '$2\pi r$'.

According to one embodiment, the drone instead of flying in a direction opposite to operator 605, may fly around the operator from drone positions 610 to drone position 630, thereby completing a half circle, forming an arc represented by fly-around flight path 640 (as illustrated by the dotted line). In one embodiment, drone positions 610 and 630 are equal distance from the operator 605. However, the drone travels a greater distance around the operator 605, for example, along a curve around operator 605 maintaining same altitude. Similar to fly-over path 625, according to the computed vector 635, the fly-around flight path 640 may be a function of the distance between the drone in position 610 and the operator 605. For example, if 'r' represents the distance between the drone in position 610 and the operator 605, the fly-around flight path 640 may be equal to '$2\pi r$'.

In another embodiment, drone positions 610 and 630 may be equal distance from the operator 605 but when the drone flies around the operator, then along the arc the distance from the operator may be shorter, for example, when the drone is moving along a half-eclipse or other curve instead of a half circle. When the planned route is around the operator as illustrated by the fly-around flight path 640, then the drone may maintain altitude and stay at an angle of 0 degrees. The distance from the user to the drone may be maintained along fly-around path 640 or, alternatively, it may be shortened or even lengthened. According to the computed vector 635, the fly-around flight path 640 may be a function of the distance between the drone in position 610 and the operator 605, such as if the distance is represented by 'r', the fly-over flight path 650 may be equal to '$2\pi r$'. According to fly-around flight path 640, the drone does not change altitude and moves along a horizontal plane orthogonal to a vertical axis along the height of the operator.

Figure 8:
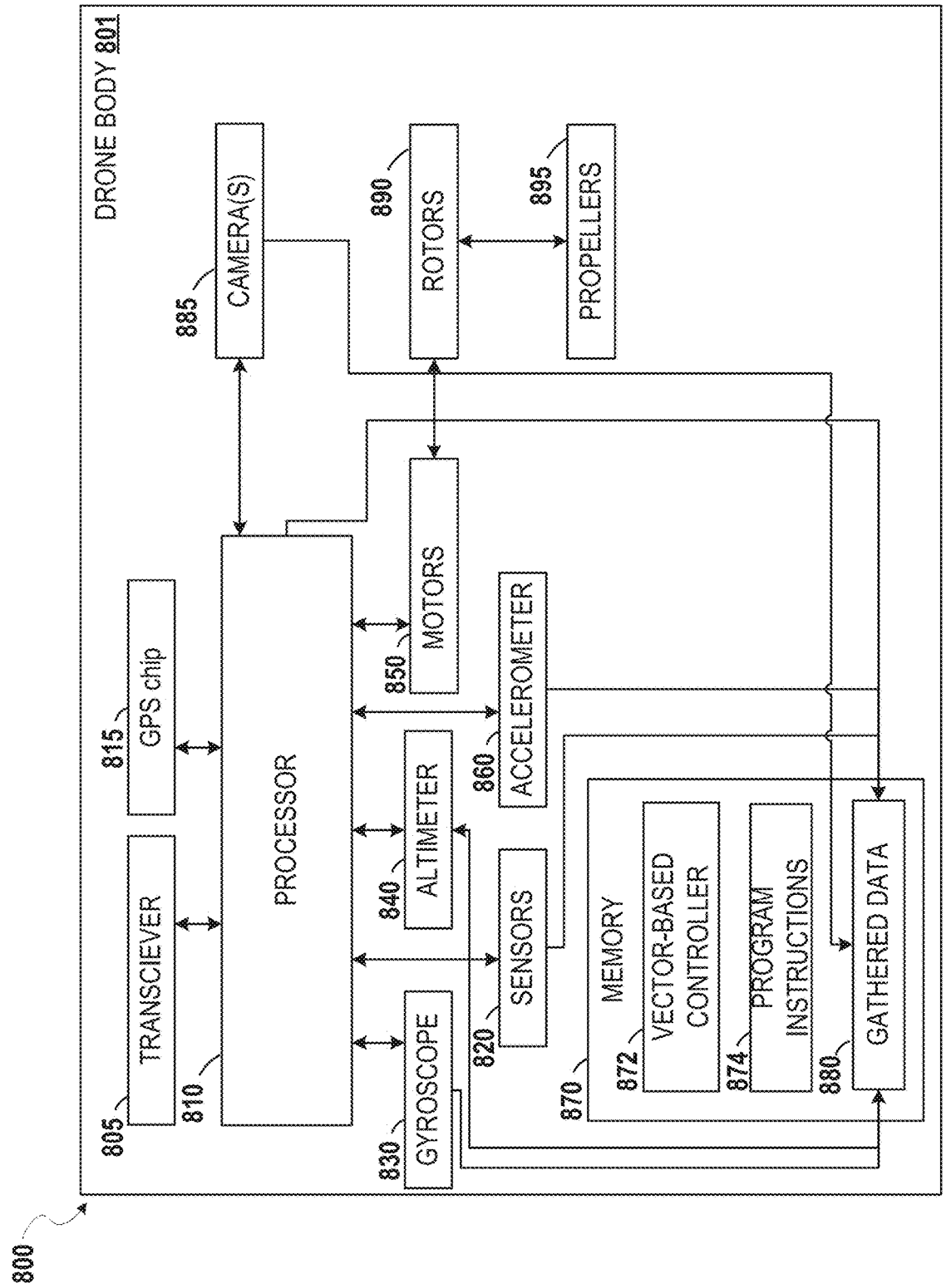
FIG. 8 represents an exemplary simplified drone, according to one embodiment.

FIG. 8 represents an exemplary simplified drone 800, according to one embodiment. Drone 800 comprises a drone body 801. In one embodiment, the drone may be a quadcopter having a body housing an electrically powered drive mechanism to drive, for example, four rotors 890 mounted on drone body 801 in order to provide aerodynamic lift to the drone 800, as well as to accelerate and rotate the drone 800. The rotors 890 are actuated by motors 850 in response to instructions executed by processor 810, spin the propellers 895. In one embodiment, drone 800 may comprise one or more removable battery sources (not illustrated) to power, among others, rotors 890. Having more than one motor 850 gives the drone 800 more fail-safes. For instance, if one of the motors fails, the drone 800 can still stay aloft with the remaining motors working in concert to compensate. In addition, the more rotors that are incorporated into the drone body 801, the more lift the drone 800 will generate. allowing the drone to carry a heavier payload such as one or more cameras 885.

Figure 9:
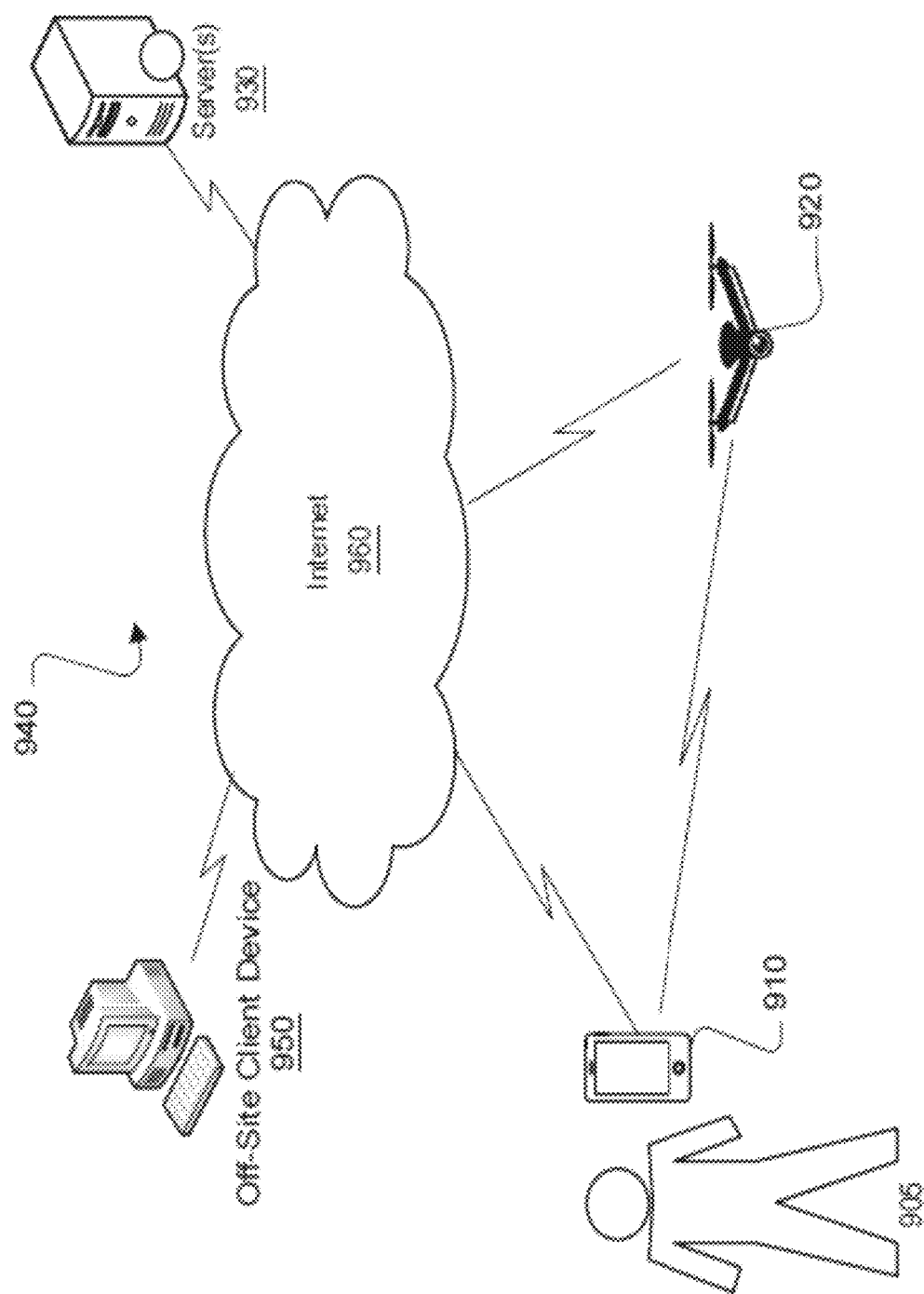
FIG. 9 is a schematic diagram illustrating a drone system 900, according to one embodiment.

In one embodiment, drone 800 further includes one or more cameras 885 mounted on drone body 801. For example, a front camera may be mounted onto the drone body 801, where the drone camera is positioned to pick up images of the scene towards which the drone is directed. In addition, an auxiliary camera or a vertically-directed camera may be mounted on the drone body 801, where the vertically-directed camera is positioned to pick up images of the terrain being overflown. The one or more cameras 885 may be movably or fixedly mounted on the drone body 801, being coupled to the body 801 via one or more actuators or other mechanisms to control orientation of the one or more cameras 885 relative to the drone body 801. Data such as video and digital images captured by cameras 885 may be stored in memory 870, e.g., as gathered fata 880. Further, data captured by cameras 885 may be streamed wirelessly in near-real time to a control device or to one or more server or client system as illustrated in FIG. 9

In order to take flight, drones may require a controller, e.g., a remote control device that a pilot may use to launch, land, and navigate drone 800. Controllers can take many forms, from gamepad-like controllers to smartphones and tablets. Regardless of their design, controllers require communication with the drone. and typically do that using radio waves. For example, drones are typically run by 2.4 gigahertz radio waves. To communicate with a drone, many drone controllers use Wi-Fi. which can be transmitted on the 2.4 gigahertz spectrum, and is used by smartphones and tablets for communication. In one embodiment, drone 800 communicates with one or more controllers or remote control devices (not illustrated in FIG. 8) via transceiver 805.

In one embodiment, modern onboard drone technology includes a GPS chip 815 inside the drone body 801 that relays location of drone 800 to the controller. It also logs, for example, in memory 870, the takeoff spot of drone 800. The takeoff spot may be used in case the drone 800 needs to return unassisted. GPS chip 815 provides accurate position of the drone 800 and allows for auto-pilot features or for methods, as described herein, for movement control based on a user-drone vector. GPS chip 815 allows drone 801 to follow a pre-programmed path; return home or to a starting position autonomously if drone 801 loses data connection or flies out of range; and also to operate in follow mode in which drone 801 follows the pilot at a specified altitude and distance. In one embodiment. GPS technology is not necessary prerequisite methods for controlling the drone's movement based on the user-drone vector.

Accelerometer 860 in conjunction with gyroscope 830 and altimeter 840 are the onboard sensors that keep drone 800 aloft. For instance, altimeter 840 is an instrument for determining attained altitude, e.g., especially used in aircrafts. So, when the drone is set to hover in place, the altimeter 840 will instruct the drone to maintain that height. In addition, the GPS chip 815 allows the drone to be hold within the x and z axes, correcting course when necessary such as when there is wind. Accelerometer 860 is a device that measures acceleration and velocity and is used in drones for flight stabilization. Gyroscope 830 is instrument for measuring and maintaining orientation. Sensors 820 may be additional navigational or motion sensors or other types of sensors concerned with sensing the surrounding environment, or any other suitable type of sensor.

In one embodiment, navigation of drone 800 may be pre-programmed and a route to be represented as a machine readable program instruction 874 loaded into memory 870 of drone 800. Alternatively or in addition, movement of the drone may be controlled by vector-based controller component 872 embodied in machine readable program instruction loaded into memory 870 and executed by processor 810, according to various methods described herein. A flight route for drone 800 may be computed based on a user-drone vector as implemented by vector-based controller 872.

FIG. 9 is a schematic diagram illustrating a drone system 900 of which a drone 920 such as that previously described may in some embodiments form part. In embodiments such as that shown in FIG. 9, the drone 920 may, instead of or in addition to an on-site control device (e.g., mobile phone 910), be communicatively coupled via a distributed network (e.g., the Internet 960), to one or more off-site client devices 950 and/or to one or more servers 930 providing various online services. In some instances, communication between the on-site remote control device 910 and the drone 920 may be via the Internet 960 (e.g., by means of a cellular telephone network). In some embodiments, the server 930 may provide a social networking service, to enable communication of content (e.g., photos, videos, status updates, media content messages, and the like) directly to social media sites from the drone 920, in flight. For example, data captured by cameras of drone 920 may be broadcasted or otherwise communicated wireless in near-real time to a control device such as mobile phone 910 or to one or more server 930 or client systems 950.

Figure 10:
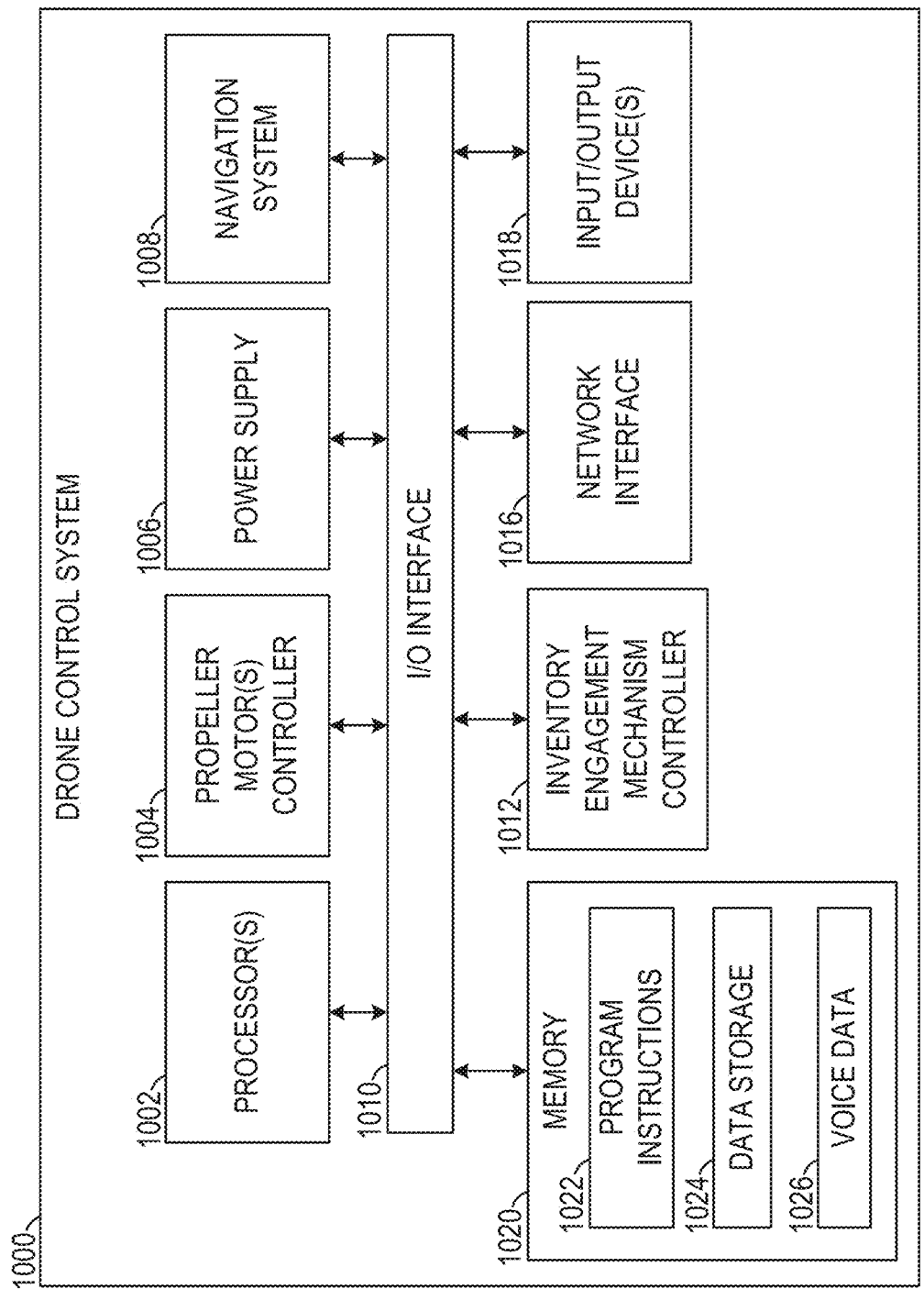
FIG. 10 is a block diagram illustrating an example UAV control system of a UAV such as a drone, according to one embodiment.

FIG. 10 is a block diagram illustrating an example UAV control system 1000 of a UAV such as the drone 800 previously described with reference to various example embodiments. In various examples, the block diagram may be illustrative of one or more aspects of the UAV control system 1000 that may be used to implement the various systems and methods discussed above. In the illustrated implementation, the UAV control system 1000 includes one or more processors 1002, coupled to a non-transitory computer readable storage medium in the form of a memory 1020 via an input/output (I/O) interface 1010. The UAV control system 1000 may also include a propeller motor controller 1004, such as an electronic speed control (ESC), a power supply 1006 and/or a navigation system 1008. The UAV control system 1000 further includes an inventory engagement mechanism controller 1012, a network interface 1016, and one or more input/output devices 1018.

In various implementations, the UAV control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, navigation paths and/or data items accessible by the processor(s) 1002. In various implementations, the nontransitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024 and voice data 1026, respectively. In other implementations, program instructions, data and/or voice data may be received, sent or stored upon different types of computer-accessible media, such as non-transitory media, or on similar media separate from the non-transitory computer readable storage medium 1020 or the UAV control system 1000. Generally speaking, a non-transitory, computer readable storage medium may include storage media or memory media such as magnetic or optical media, e.g., disk or CD/DVDROM, coupled to the UAV control system 1000 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1010 or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propeller motor(s) controller 1004 communicates with the navigation system 1008 and adjusts the power of each propeller motor to guide the UAV along a determined navigation path to a delivery location. The navigation system 1008 may include a GPS or other similar system than can be used to navigate the UAV to and/or from a delivery location. The inventory engagement mechanism controller 1012 communicates with the motor(s) (e.g., a servo motor) used to engage and/or disengage inventory. For example, when the UAV is positioned over a level surface at a delivery location, the inventory engagement mechanism controller 1012 may provide an instruction to a motor that controls the inventory engagement mechanism to release the inventory.

The network interface 1016 may be configured to allow data to be exchanged between the UAV control system 1000, other devices attached to a network, such as other computer systems, and/or with UAV control systems of other UAVs. For example, the network interface 1016 may enable wireless communication between numerous UAVs that are transporting inventory to various delivery destinations. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1018 may, in some implementations, include one or more displays, image capture devices, thermal sensors, infrared sensors, time of flight sensors, accelerometers, pressure sensors, weather sensors, etc. Multiple input/output devices 1018 may be present and controlled by the UAV control system 1000. One or more of these sensors may be utilized to assist in the landing as well as avoid obstacles during delivery and/or engagement of inventory. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 10, the memory 1020 may include program instructions 1022 which may be configured to implement the example processes and/or sub-processes described above. The data storage 1024 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Software Architecture

Figure 11:
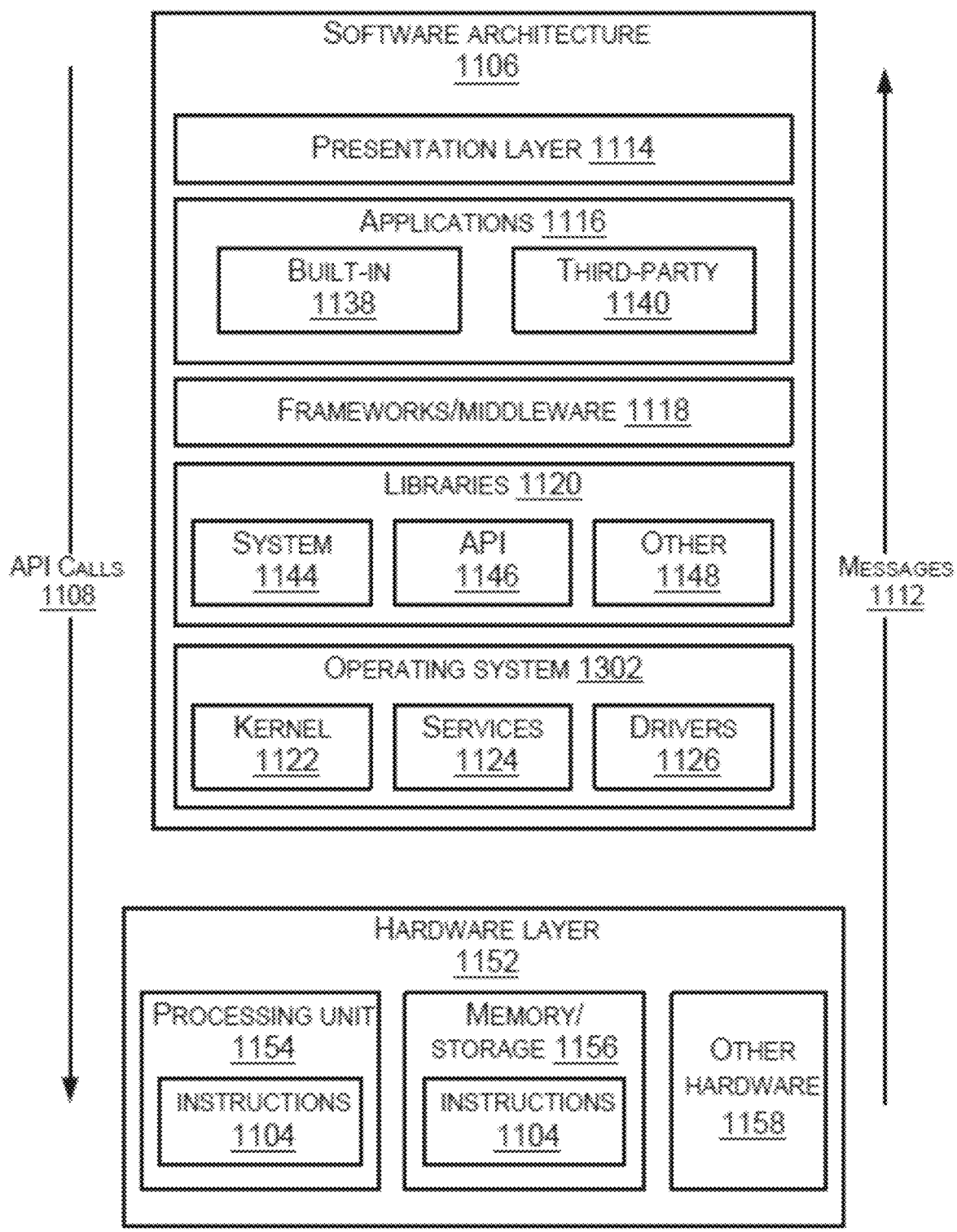
FIG. 11 is a block diagram illustrating an example software architecture, which may be used in conjunction with various hardware architectures herein described, according to one embodiment.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1210, memory 1230, and I/O components 1250. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
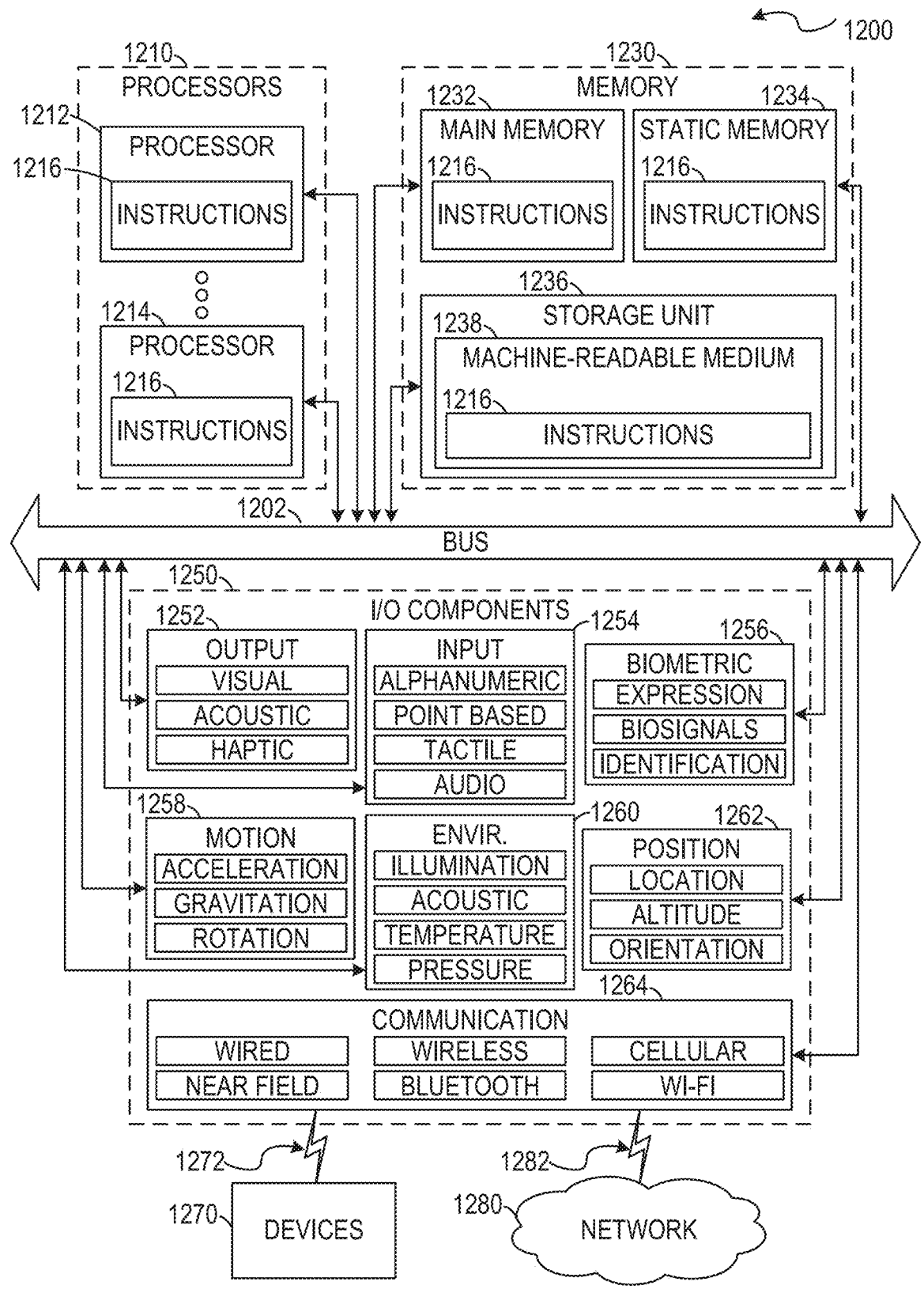
FIG. 12 illustrates components of a machine able to read instructions from a machine-readable medium and perform any one or more of the methodologies discussed herein, according to one embodiment.

FIG. 12 is a block diagram illustrating components of a machine 1200, according to some example embodiments, able to read instructions from a machine-readable medium 1238 (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. As such, the instructions 1216 may be used to implement modules or components described herein. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines that individually or jointly execute the instructions 1216 to perform any one or more of the methodologies discussed herein.

The machine 1200 may include processors 1210, memory memory/storage 1230, and I/O components 1250, which may be configured to communicate with each other such as via a bus 1202. The memory/storage 1230 may include a memory, such as a main memory 1232 and static memory 1234, or other memory storage, and a storage unit 1236, both accessible to the processors 1210 such as via the bus 1202. The storage unit 1236 and main memory 1232 and static memory 1234 store the instructions 1216 embodying any one or more of the methodologies or functions described herein. The instructions 1216 may also reside. completely or partially, within the main memory 1232 and static memory 1234. within the storage unit 1236, within at least one of the processors 1210 (e.g., within the processor's cache memory), or any suitable combination thereof, during execution thereof by the machine 1200. Accordingly, the main memory 1232 and static memory 1234, the storage unit 1236, and the memory of processors 1210 are examples of machine-readable media.

The I/O components 1250 may include a wide variety of components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and output components 1252. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The output components 1252 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental environment components 1260, or position components 1262 among a wide array of other components. For example, the biometric components 1256 may include components to detect expressions (e.g., hand expressions, facial expressions, vocal expressions. body gestures, or eye tracking), measure biosignals (e.g., blood pressure, heart rate. body temperature, perspiration, or brain waves), identify a person (e.g., voice identification, retinal identification, facial identification, fingerprint identification. or electroencephalogram based identification), and the like. The motion components 1258 may include acceleration sensor components (e.g., accelerometer), gravitation sensor components, rotation sensor components (e.g., gyroscope), and so forth. The environment components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264. such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessorbased or programmable consumer electronics game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor. the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network being the k (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications. additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   positioning a flight-capable drone in a pre-launch state;
   while the drone is in the pre-launch state, computing a launch vector between a flight-capable drone and a reference object, the launch vector comprising:
   a launch vector direction defined by a rectilinear direction from the drone in the pre-launch state to the reference object; and
   a launch vector magnitude defined by a rectilinear spacing along the launch vector direction between the reference object and the drone in the pre-launch state;
   determining one or more attributes for a flightpath based at least in part on the computed launch vector, wherein the determined flightpath attributes include a flight speed which is calculated to be variable as a function of the launch vector magnitude between different instances of flight launch; and
   in an automated operation performed using one or more computer processors, controlling launch and flight of the drone according to the determined flightpath attributes.

2. The method of claim 1, wherein the flightpath is such that the one or more determined flightpath attributes remain constant during execution of the flightpath based on the launch vector values calculated pre-launch state, irrespective of in-flight changes in a spatial vector defined between the drone and the reference object.

3. The method of claim 1 further comprising:
while the drone is positioned in the pre-launch state, positioning a human operator as the reference object such that the drone is located substantially in a straight line between the operator and a target location; and
determining the one or more flightpath attributes such that a terminus of the flightpath coincides substantially with the target location.

4. The method of claim 1 further comprising:
before determining the one or more flightpath attributes, tracking movement of a human operator as the reference object; and
in response to determining that the operator has stopped moving for more than a predetermined trigger period, automatically computing the launch vector based on the current location of the operator.

5. The method of claim 1, wherein the one or more flightpath attributes further include a flight distance which is variable between different instances of flight launch as a function of the respective launch vector magnitude.

6. The method of claim 5 wherein the determining of the flightpath attributes further comprises:
assigning a flight distance of the flightpath to be equal to the launch vector magnitude.

7. The method of claim 1, wherein the one or more flightpath attributes further include a flight direction which is variable between different instances of flight launch as a function of the launch vector direction.

8. The method of claim 7 wherein the determining of the flightpath attributes further comprises:
assigning to the flightpath a launch direction away from the reference object, being opposite to the launch vector direction.

9. A flight-capable drone comprising:
an on-board computer having memory and at least one processor, the memory storing instructions which when executed by the at least one processor cause operations comprising:
while the drone is positioned in a pre-launch state, computing a launch vector between a flight-capable drone and a reference object, the launch vector comprising:
a launch vector direction defined by a rectilinear direction from the drone in the pre-launch state to the reference object; and
a launch vector magnitude defined by a rectilinear spacing along the launch vector direction between the reference object and the drone in the pre-launch state;
determining one or more attributes for a flightpath based at least in part on the computed launch vector, wherein the determined flightpath attributes include a flight speed which is calculated to be variable as a function of the launch vector magnitude between different instances of flight launch; and
controlling launch and flight of the drone according to the determined flightpath attributes.

10. The flight-capable drone of claim 9, wherein the flightpath is such that the one or more determined flightpath attributes remain constant during execution of the flightpath based on the launch vector values calculated pre-launch state, irrespective of in-flight changes in a spatial vector defined between the drone and the reference object.

11. The flight-capable drone of claim 9, wherein the operations further comprise:
while the drone is positioned in the pre-launch state, positioning a human operator as the reference object such that the drone is located substantially in a straight line between the operator and a target location; and
determining the one or more flightpath attributes such that a terminus of the flightpath coincides substantially with the target location.

12. The flight-capable drone of claim 9, wherein the operations further comprise:
before determining the one or more flightpath attributes, tracking movement of a human operator as the reference object; and
in response to determining that the operator has stopped moving for more than a predetermined trigger period, automatically computing the launch vector based on the current location of the operator.

13. The flight-capable drone of claim 9, wherein the one or more flightpath attributes further include a flight direction which is variable as a function of the direction of the spatial vector.

14. The flight-capable drone of claim 13, wherein the wherein the determining of the flightpath attributes further comprises:
assigning a flight distance of the flightpath to be equal to the launch vector magnitude.

15. The flight-capable drone of claim 9, wherein the one or more flightpath attributes further include a flight direction which is variable between different instances of flight launch as a function of the launch vector direction.

16. The flight-capable drone of claim 15 wherein the wherein the determining of the flightpath attributes further comprises:
assigning to the flightpath a launch direction away from the reference object, being opposite to the launch vector direction.

17. A non-transitory processor-readable storage medium storing processor executable instructions that, when executed by a processor of a machine, cause the machine to perform operations comprising:
while a flight-capable drone is positioned in a pre-launch state, computing a launch vector between a flight-capable drone and a reference object, the launch vector comprising:
a launch vector direction defined by a rectilinear direction from the drone in the pre-launch state to the reference object; and
a launch vector magnitude defined by a rectilinear spacing along the launch vector direction between the reference object and the drone in the pre-launch state;
determining one or more attributes for a flightpath based at least in part on the computed launch vector, wherein the determined flightpath attributes include a flight speed which is calculated to be variable as a function of the launch vector magnitude between different instances of flight launch; and
controlling launch and flight of the drone according to the determined flightpath attributes.

18. The non-transitory processor-readable storage medium of claim 14, wherein the determining of the flightpath attributes further comprises:
assigning to the flightpath a launch direction towards the reference object, and assigning to the flightpath a flight distance as a function of the launch vector magnitude, wherein the flight distance is greater than the launch vector magnitude.

19. The non-transitory processor-readable storage medium of claim 14, wherein the operations further comprise:
   while the drone is positioned in the pre-launch state, identifying a target location located in a straight line extension, through the reference object in the launch vector direction.

20. The non-transitory processor-readable storage medium of claim 17, wherein the one or more flightpath attributes further include a flight distance which is variable as a function of the launch vector magnitude.

21. The non-transitory processor-readable storage medium of claim 20, wherein the determining of the flightpath attributes further comprises:
   assigning a flight distance of the flightpath to be equal to the launch vector magnitude.

22. The non-transitory processor-readable storage medium of claim 17, wherein the one or more flightpath attributes further include a flight direction which is variable between different instances of flight launch as a function of the launch vector direction.

23. The non-transitory processor-readable storage medium of claim 22, wherein the determining of the flightpath attributes further comprises:
   assigning to the flightpath a launch direction away from the reference object-, being opposite to the launch vector direction.

\* \* \* \* \*

UNITED STATES PATENT AND TRADEMARK OFFICE
CERTIFICATE OF CORRECTION

PATENT NO. : 11,531,357 B1
APPLICATION NO. : 16/146569
DATED : December 20, 2022
INVENTOR(S) : Nielsen et al.

It is certified that error appears in the above-identified patent and that said Letters Patent is hereby corrected as shown below:

In the Claims

In Column 28, Line 25-26, in Claim 14, delete "wherein the wherein the" and insert --wherein the-- therefor In Column 28, Line 34-35, in Claim 16, delete "wherein the wherein the" and insert --wherein the-- therefor In Column 28, Line 64, in Claim 18, delete "claim 14," and insert --claim 17,-- therefor In Column 29, Line 5, in Claim 19, delete "claim 14," and insert --claim 17,-- therefor In Column 29, Line 29, in Claim 23, delete "object-," and insert --object,-- therefor Signed and Sealed this
Eleventh Day of June, 2024

Katherine Kelly Vidal
*Director of the United States Patent and Trademark Office*